(12) United States Patent
Olmstead

(10) Patent No.: US 6,905,883 B1
(45) Date of Patent: Jun. 14, 2005

(54) PROCESS FOR RECORDING, STORING, AND DISPLAYING DISCRETE TRIAL DATA

(75) Inventor: Gregory Paul Olmstead, San Diego, CA (US)

(73) Assignee: Mobile Thinking, LLC, San Diego, CA (US)

( * ) Notice: Subject to any disclaimer, the term of this patent is extended or adjusted under 35 U.S.C. 154(b) by 0 days.

(21) Appl. No.: 10/759,980

(22) Filed: Jan. 16, 2004

(51) Int. Cl.⁷ .............................................. G09B 19/00
(52) U.S. Cl. ..................................... 436/236; 434/322
(58) Field of Search ................................ 434/236, 237, 434/335, 336, 351, 353, 322, 323, 350, 352, 362

(56) References Cited

U.S. PATENT DOCUMENTS

| | | | | |
|---|---|---|---|---|
| 5,002,491 A | * | 3/1991 | Abrahamson et al. | 434/322 |
| 6,077,085 A | * | 6/2000 | Parry et al. | 434/322 |
| 6,315,572 B1 | * | 11/2001 | Owens et al. | 434/322 |
| 6,386,883 B2 | * | 5/2002 | Siefert | 434/322 |
| 6,419,496 B1 | * | 7/2002 | Vaughan, Jr. | 434/322 |
| 6,535,861 B1 | * | 3/2003 | O'Connor et al. | 706/11 |
| 6,606,479 B2 | * | 8/2003 | Cook et al. | 434/350 |
| 6,685,476 B1 | * | 2/2004 | Safran, Sr. | 434/169 |
| 6,729,885 B2 | * | 5/2004 | Stuppy et al. | 434/322 |

\* cited by examiner

*Primary Examiner*—Kurt Fernstrom
(74) *Attorney, Agent, or Firm*—Knobbe Martens Olson & Bear LLP

(57) ABSTRACT

A method and process embodied in one or more computer software programs to record, store, and display discrete trial therapy data, to include a user interface to add and modify Student account information, to record Student performance data in a database, and to display Student performance data from a database. The method further includes: a user interface to add and modify curricular information in a database; a user interface to display curricular data, Student information, and performance data in user-selected formats; and a user interface to add and modify information about people or groups associated with the Student accounts in the database.

27 Claims, 14 Drawing Sheets

PROCESS FOR RECORDING, STORING, AND DISPLAYING DISCRETE TRIAL DATA

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

The invention relates to a method and process embodied in one or more computer software programs to record, store, and display discrete trial therapy data. Discrete trial therapy (or, the discrete trial method) was developed by Ivar Iovaas at the University of California at Los Angeles. The process of providing discrete trial therapy services may be summarized as follows: a person providing services (hereinafter referred to as a Tutor) will meet with a person receiving services (hereinafter referred to as Student). The Tutor may select a "curriculum area" (e.g., toys, letters, people, animals), a "target" associated with the selected curriculum area (e.g., if the curriculum area is "animals," then possible targets may include: dog, cat, mouse, elephant), and a discriminative stimulus (Sd) that is relevant to the target (e.g., "point to the __.", "where is the __?", "show me the __."). The Tutor then makes a statement (or asks a question) that combines the selected Sd and the target (e.g., "point to the mouse."). Each time that a statement is made (or a question is posed) is typically referred to as a "trial." A group of trials may be referred to as a "session." The Tutor typically records a Student's response for each trial in the session. Tutors may vary the curriculum area, the target, and the Sd from session to session. The Tutor typically uses a paper-based form to record session and trial data, which may include: the Student's response to each trial, the date and approximate time of the session, the curriculum area, the target, the Sd, the Tutor's name, the Student's name, and any notes relevant to the session. Session data that is recorded on paper may be collected in a binder (or similar repository), and analyzed periodically.

Typically, discrete trial data is captured manually by Tutors, using pencil and paper. Pages of session data corresponding to an individual Student may be stored in binders, and aggregated data is typically heuristically derived from the raw data. Some data may be entered into a spreadsheet, but this effort is prone to error, and any quantitative results beyond basic arithmetic and statistics require sophisticated spreadsheet-programming techniques and knowledge.

The preferred embodiment seeks to obviate the inefficiencies and errors inherent in the manual recording of data by using a method that enables discrete data to be recorded directly into a database, whereupon it may be aggregated quickly and easily. The benefits to the proposed method are profound. Using a suitable user interface in the computer program, session data may be sorted by data, by curriculum area, by Tutor, by Student, and so on with a minimum of technical knowledge on the part of the user of the invention. Database queries may be filtered according to user-selected variables and displayed quickly and easily. Displayed results may be printed, or exported to a file. Weeks, months, and years of a Student's session data may be electronically archived with a few computer commands, helping to ensure compliance with any legal requirements to store Student data until a Student becomes a certain age.

There is an invention (U.S. Pat. No. 6,537,073, issued Mar. 25, 2003) that enables a use to deliver content to a learning disabled person, but the invention focuses on delivering content to a single user instead of enabling data recording for multiple Students. The inventor for this current application knows of no existing method, embodied in one or more computer software programs that enables a person or persons providing discrete trial therapy services to record, store, and display discrete trial data.

BRIEF SUMMARY OF THE INVENTION

The present invention seeks to obviate the disadvantages and limitations of the described prior arrangements. In particular, the invention comprises one or more computer programs that facilitate the recording, storing and displaying of discrete trial data.

Discrete trial therapy services are typically delivered by privately owned companies (i.e., an agency) to its clientele of Students, or delivered through school systems. Students may visit an agency or a school to receive services, or a Tutor may visit the Student to provide services. For large numbers of Students, it is unwieldy and inefficient to monitor and manage session data over time.

In the preferred embodiment, a person who is using the invention uses one or more computer programs to create and modify user accounts for every Tutor who provides services to Students and for every for Student who receives services. A person may also use the invention to create and modify a library of curriculum areas, targets, and Sd's that may be used by a Tutor when providing services to a Student, and to record trial data on the computer.

Another aspect of the invention is a method for recording discrete trial data on a mobile computer. A Tutor uses this aspect of the invention to record session data while away from the computer in which the curriculum areas, targets, Sd's, accounts, and so on are stored.

Because the data recording may be conducted on a mobile device, there is an additional aspect of the invention that enables different computer programs of the invention to share and to exchange database contents, despite having the databases reside on computers using different operating systems and platforms. This enables an agency, or other group or individual that provides services, to record data on multiple mobile devices, and aggregate collected data into a database on a single computer.

Another aspect of the invention is a method for querying the aggregated data to display data that enable an agency, group, or individual that is providing services to provide more effective treatment and therapy.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
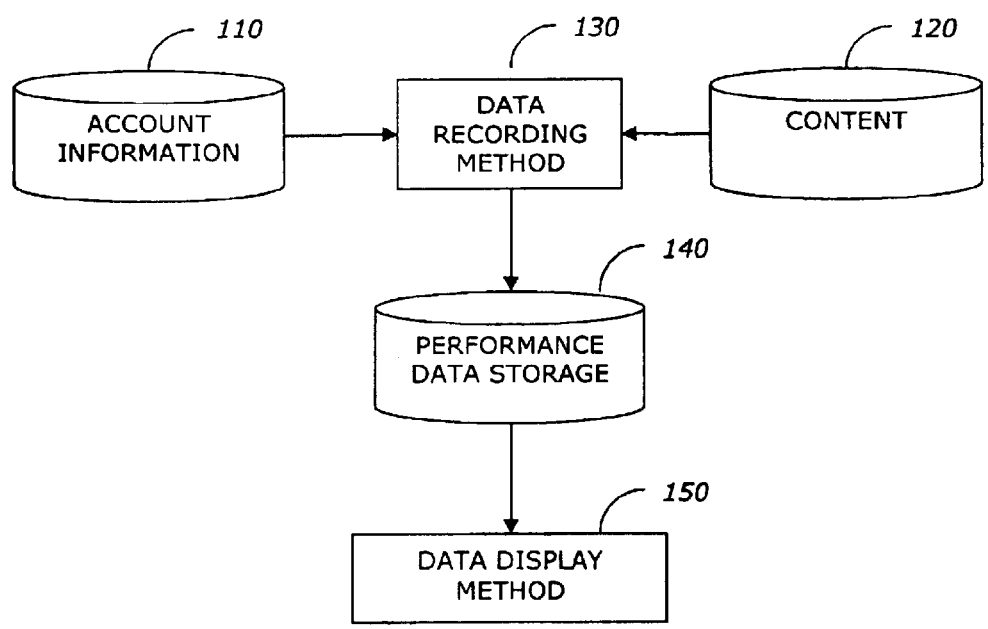
FIG. 1 is a general overview of a discrete trial data recording, storage, and data display system.

FIG. 1 is a general overview of a discrete trial data recording, storage, and display system. In one embodiment, database 110 stores the information necessary to identify the individual people who are involved in the delivery of discrete trial therapy services. This may include the Students who receive the therapy services and Tutors who deliver therapy services to Students.

In one embodiment, database 120 stores the Content that may be used during the delivery of therapy services. The Content may be a list of curriculum areas, lists of targets related to individual curriculum areas, and lists of Sd's related to individual curriculum areas. In the preferred embodiment, a user of the invention may create new Content and modify existing Content as needed.

In one embodiment, block 130 is a process in which the Tutor records data that may be related to the Student and to some Content. For example, the Tutor may record: the Tutor's own name, responses a Student may make with respect to specific content, the time that responses were recorded, the date on which responses were recorded, performance metrics (e.g., percent correct), textual notes, graphical notes, the specific Content that was used during the delivery of therapy services, and so on. As the data is recorded, using the procedure in block 130, it may be stored in database 140.

Database 140 is a repository of data recorded as a result of the procedure in block 130. Data in database 130 may contain references to accounts in database 110 and Content in database 120. Using the data in database 140, the user of the invention may display data using a process in block 150.

Block 150 is a process for displaying data from database 140. The displayed data may be results from predefined queries to the database, they may be statistical data generated by current or previous queries, or they may be results to queries that allow for the user of the invention to filter data according to user-selected parameters. For example, the user may display progress results for one or more Students, organize data according to different criteria, display raw data, and display cumulative time spent in delivering therapy services.

Figure 2:
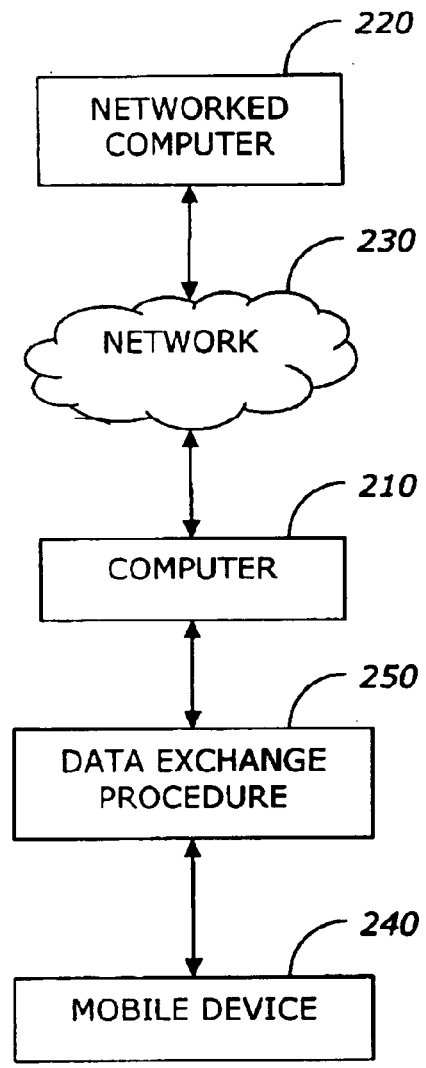
FIG. 2 is a general overview of a system comprising a computer system that may be associated with a communications network, with mobile devices, with both, or with neither.

FIG. 2 is a general overview of a system comprising a computer system that may be associated with a communications network, with mobile devices, with both, or with neither.

Computer 210 includes conventional computer electronics including a motherboard containing the processor and an associated chip set, a communications bus, a user input device (e.g., mouse), a display device (e.g., a screen or monitor), a power supply and various interface and drive electronics. In one embodiment, computer 210 is a processor configured to perform specific tasks. The computer 210 may have a configuration based on Intel Corporation's family of microprocessors, such as the Pentium family and Microsoft Corporation's Windows operating systems such as Windows 98, Windows Millennium Edition, Windows 2000, or Windows XP.

It is contemplated, however, that the computer 210 can be implemented with a wide range of computer platforms using conventional general purpose single chip or multichip microprocessors, digital signal processors, embedded microprocessors, microcontrollers and the like. It is also contemplated that the computer 210 may be implemented with a wide range of operating systems such as Unix, Linux, Microsoft DOS, Microsoft CE, Macintosh OS, OS/2 and the like.

In one embodiment, the system comprised of database 110, database 120, block 130, database 140, and block 150 may be installed on only computer 210. In another embodiment, any combination of databases 110, database 120, block 130, database 140, and block 150 may be installed on any combination of computer 210, networked computer 220, and mobile device 240.

Computer 220 may be substantially similar to computer 210 with regard to hardware and operating system. In one embodiment, Computer 220 and computer 210 may be connected by a communications network 230 such as a local area network (LAN), a wide area network (WAN), TCP/IP, 802.11, Ultra Wide Band, Bluetooth, and so on, that provide continually available network connectivity between computer 210 and computer 220.

Computer 240 may be a computer device that may not have continually available network connectivity with computer 210, and instead exchanges data with computer 210 periodically. Computer 240 may need to store data in a form and format that may be consistent with the form and format of data stored on computer 210. It is contemplated that mobile device 240 may be implemented with a wide range of platforms designed for mobile computing, using conventional devices such as handheld computers, data-enabled mobile phones, smart phones, data-enabled watches, pagers, Blackberry-type devices, and so on, running operating systems such as the Palm OS, Windows Pocket PC, Windows XP Tablet PC Edition, Symbian, Linux, and so on. Data may be exchanged between mobile device 240 and computer 210 via a data exchange procedure in block 250. The procedure in block 250 may be specific to the configuration of the mobile device 240. For example, if the mobile device 240 is a Palm OS compatible device, data between mobile device 240 and compute 210 may be exchanged via infrared beaming, Bluetooth, USB cable, or an SDIO card. Regardless of the type of mobile device 240, in one embodiment, block 250 must enable data to be exchanged between mobile device 240 and computer 210.

In one embodiment, database 110, database 120 and database 140 may reside on a hard drive of computer 210, and block 130 may be an input method enabled on computer 220 that allows data from database 110 and database 120 to be visible on computer 220 so that data may be recorded via block 130, the results of which may be stored on computer 210. In another embodiment, the system on computer 210 may be a multi-user application (such as on the CYTRIX system) so that all data resides on computer 210. In another embodiment, database 110, database 120, and input method 130 are copied periodically to computer 220 by network 230, so that if computer 220 creates a database 140, then database 140 may be copied back to computer 210.

In the preferred embodiment, modifications and updates to database 110, database 120, and database 140 are enabled from only computer, 210, although copies or subsets of database 110, database 120, and database 140 may exist on computer 220, on mobile computer 240, or both.

In another embodiment, copies of database 110, database 120 and database 140 may be sent to mobile device 240 during data exchange 250. Remote device 240 may be enabled to store subsets of databases 110 and 120 and has installed on it data input method 130. As data is collected on mobile device 240, performance data (data which will be later added to database 140) is created. The next time computer 210 and mobile device 240 exchange data via block 250, updated copies of database 110, database 120 and database 140 may be sent from computer 210 to mobile device 240 and a database 140 may be sent from mobile device 240 to computer 210 where it is aggregated with previous data.

In another embodiment, block 130 may be enabled on both computer 210 and mobile device 240, on both computer 210 and computer 220, or on all of computer 210, computer 220, and mobile device 240.

In one embodiment, database 140 may reside on the hard drive of computer 210 and the display procedure in block 150 may be enabled on computer 210. In another embodiment, the display procedure in block 150 may be enabled on computer 210, which may query database 140 on computer 210 over network 230. In another embodiment, the display procedure in block 150 may be enabled on computer 210, which may query a copy of database 140 that resides on the hard drive of computer 220.

Figure 3:
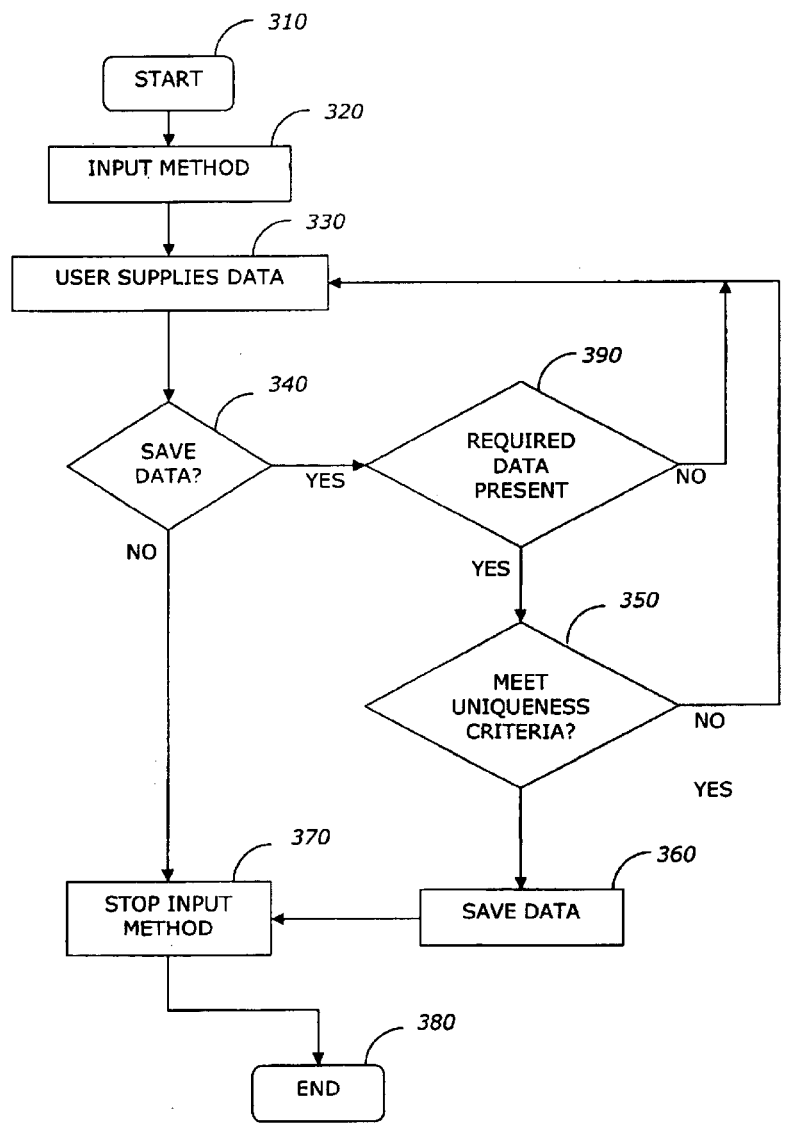
FIG. 3 is a flow diagram illustrating the procedure for adding a user account.

FIG. 3 is a flow diagram illustrating the procedure for adding a user account. In one embodiment, there may be different types of accounts for different types of people for whom data is stored. A person using the invention would initiate the process at the START block 310 by using means typically available to a computer user: the computer user could click a button, choose a command from a menu, press a combination of keyboard keys, and so on.

At block 320 the computer user may be presented with a method for inputting data into a computer, (e.g., an onscreen form) that may present the user with options for providing data relevant to the user account. The input method may contain any combinations of text fields to receive text, pulldown menus to choose from short lists of predetermined data options (e.g. months of the year), radio buttons to force the user to choose between or among sets of options (e.g. male or female), check boxes to indicate whether a choice is selected or not selected, and so on. The fields that are provided in block 320 may be different for different types of users. Block 320 may contain certain fields if the computer user is seeking to create a Tutor account, and block 320 may contain certain other fields if the user is seeking to create a Student account.

At block 330, the user of the invention provides data into block 320. The data corresponds to the person for whom the account is being created. In one embodiment, the computer user may be required to provide certain data to be able to create the account, whereas some data may be optionally provided. In one embodiment, the user of the invention may later modify some data that may have been supplied in block 330, and in other embodiments of the invention, the user may not modify any of the data that may have been supplied in block 330.

Proceeding to block 340, the user of the invention may elect to save and store the data supplied in block 330, or discard the data supplied in block 330. If the user elects to discard the data supplied in block 330, no new user account is created, no new database record is created, the new form closes (block 370), and the user of the invention proceeds to block 380. The user of the invention may elect to save the data supplied in block 330, with the intention of creating a new user account in a database. If the user of the invention elects to save the data and create the account, the process proceeds to block 390.

In block 390, the process evaluates the data supplied in block 330 to determine whether the data that is required in block 330 is present. In one embodiment, it may be required to provide a first and last name for the user for whom the account is being created. In another embodiment, it may be required to provide a first name, a last name, and an alphanumeric username. Further, the data requirements may be different for different types of accounts. In one embodiment, the same data requirement may be applied to all accounts irrespective of the account type. In another embodiment, there may be one set of data requirements for one account type and a different set of data requirements for other account types. If the user of the invention supplies data that meets the data requirements for the type of account being created, the process proceeds to block 350. If the data requirements are not met at the time the user attempts to save the data and create the account, the user is returned to block 330 to provide the remainder of the required data.

In block 350, the process evaluates the data supplied in block 330 to determine whether the data meets uniqueness criteria determined in the embodiment. In one embodiment, uniqueness may be achieved when the computer user seeking to create the new account provides in block 330 an alphanumeric name—assuming the embodiment provides this field in block 320—for the new account that is not identical to an alphanumerical name for an account that has been previously created. This is not unlike AOL not allowing any two people to have the same email address, or a telephone company not allowing two different cell phones to have the same phone number. In another embodiment, uniqueness may be achieved by ensuring that the combination of the first and last names of the user account is not identical to the combination of the first and last name of an existing user. Further, the uniqueness requirements may be different for different types of accounts. In one embodiment, the uniqueness requirement may be applied to all accounts irrespective of the account type. In another embodiment, there may be a set of uniqueness requirements for one account type and a different set of requirements for other account types. If the user of the invention supplies sufficient data to meet the uniqueness requirements for the type of account being created, the process proceeds to block 360. If the uniqueness requirements are not met, the user is returned to block 330 to edit or provide data to satisfy the uniqueness requirements defined in the embodiment.

In block 360, because sufficient data have been supplied to meet the requirement criteria (block 390) for the type of account being created, and because the account meets the uniqueness criteria (block 350) for the type of account being created, the data that the user of the invention supplied in block 330 may be saved and stored in database 110.

The process ends at block 380, whether a new account was created or not.

Figure 4:
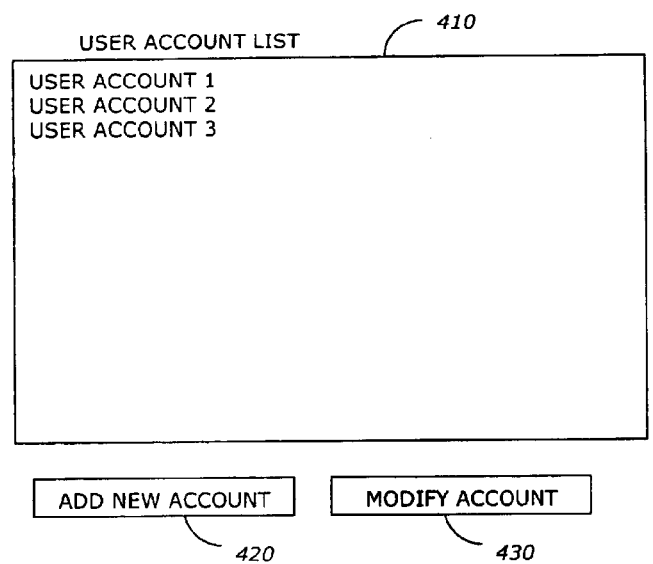
FIG. 4 is an overview of a graphical user interface for displaying user accounts.

FIG. 4 is an overview of a graphical user interface for displaying user accounts. In one embodiment, all types of accounts may be displayed within a single window. In another embodiment, different types of accounts may occupy different windows, which may occupy different screens in the computer programs.

In one embodiment, block 410 may be a scrolling list of the user accounts that have been previously created, with each row in the scrolling list corresponding to a single account.

In one embodiment, additional data corresponding to the account may be displayed in the row. For example, if the input method in block 320 provides a field for a telephone number, and the user of the invention supplies that information, one embodiment of the invention may list the phone number in the row in list 410.

Block 420 is a mechanism to enable the user of the invention to create a new account. The mechanism may be any combination of: a button that the user clicks with a mouse, a command that the user of the invention invokes by pressing one or more keyboard keys, a command that is selected from a menu, and so on. When the user of the invention elects to add a new account, the process described in FIG. 3 is followed.

Block 430 is a mechanism to enable the user of the invention to modify an existing account. That is, the user of the invention may edit data that already exists in an account, or may add new data that was not previously when the account was originally created. The mechanism in block 430 may be a button that the user of the invention clicks with a mouse, a command that the user of the invention invokes by pressing one or more keyboard keys, a command that is selected from a menu, and so on. In one embodiment, the user of the invention would select an account, then invoke the process to modify the account. When the user elects to modify an existing account, the process described in FIG. 5 is followed.

Figure 5:
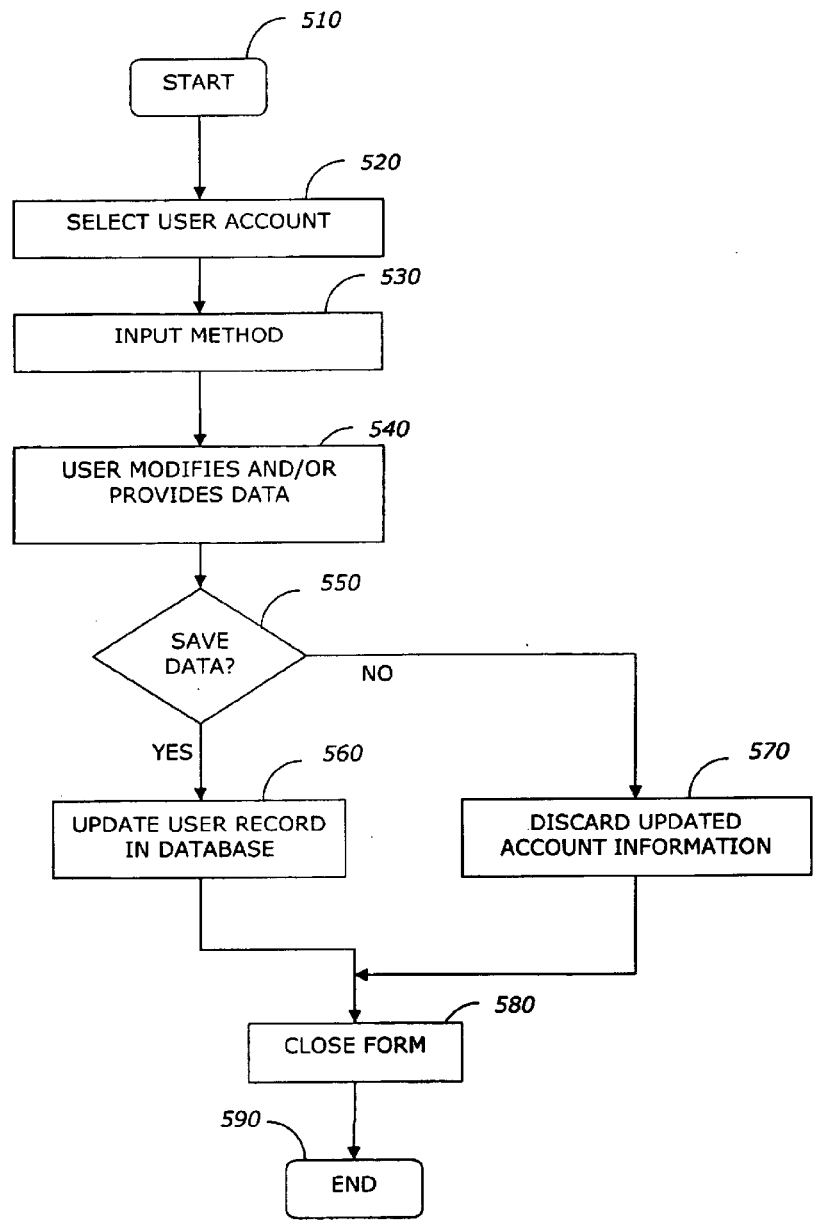
FIG. 5 is a flow diagram illustrating the procedure for modifying an existing user account.

FIG. 5 is a flow diagram illustrating the procedure for modifying an existing user account. Block 510 starts the procedure. In block 520, the user of the invention may select an account from the list described in block 410. After the user of the invention selects an account to modify, the user of the invention may proceed to block 530 by using a computer mouse to click a button, to choose an item from a menu, by pressing a combination of computer keyboard keys, and so on. Block 530 may be similar to block 320. Block 540 is an input method that the user of the invention may use to modify existing data or add new data for a user—block 540 may be similar to block 330.

Proceeding to block 550, the user of the invention may elect to save and store the modified information and/or the newly provided information. While the user of the invention is modifying data in the account, the original account data may not be modified until the user elects to save the modifications. If the user of the invention does not elect to save and store the information, the newly added data is discarded in block 570, the input method closes in block 580, and the procedure ends in block 590. Any data that was provided in block 540 may be discarded so that the account being modified remains unchanged at block 590. If the user of the invention elect to save and store the information, the account information is updated in block 560, the data is saved to database 110, the input method closes in block 580, and the procedure ends in block 590.

Figure 6:
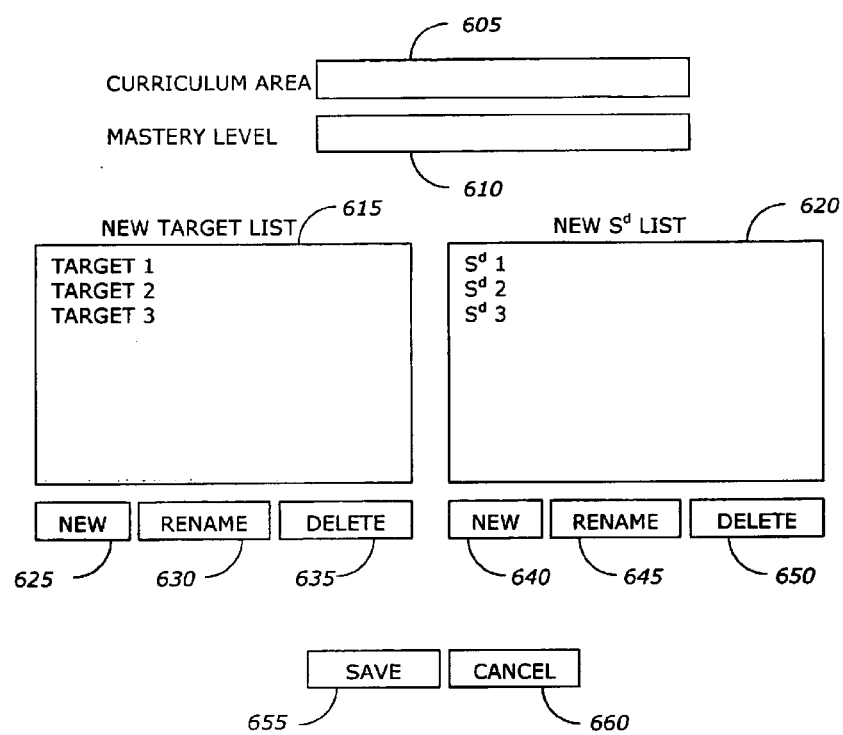
FIG. 6 is an overview of a graphical user interface for adding a new curriculum area, with associated targets and associated Sd's.

FIG. 6 is an overview of a graphical user interface for adding a new curriculum area, with associated targets and associated Sd's. In the preferred embodiment, each curriculum area that is created has associated with it a set of Sd's and a set of targets. In the preferred embodiment, sets of Sd's and sets Targets associated with one curriculum area are not associated with any other curriculum area. In another embodiment there may be a set of curriculum areas, a set of Sd's, and a set of targets that may have no defined association with each other.

In one embodiment, the user of the invention supplies in block 605 a name for the curriculum area. The name may contain letters, numbers, and symbols. There may be a limit to the number of characters a user of the invention can supply in block 605.

In one embodiment, the user of the invention supplies in block 610 a mastery level for the curriculum area. In one embodiment, a mastery level may be a single number, representing a percent between 0 and 100; this number may be used to determine if the percent correct recorded during a session (see FIG. 10) is greater than or equal to the percent correct assigned to the mastery level. In another embodiment, the mastery level may be a series of numbers, each corresponding to a different gradation of success demonstrated by the Student.

Block 615 shows, in one embodiment, a list of the targets that have been created. The list of targets that are created are, in this embodiment, associated with the curriculum area named in block 605.

A new target may be created by invoking block 625, which may be invoked by clicking a button, selecting a menu item, pressing a combination of keyboard keys, and so on. When block 625 is invoked, an input method (e.g., a small onscreen window) may appear that enables the user to provide in the name of the new target. In the preferred embodiment, the user is asked to indicate whether to save or discard the name of the new target. In the preferred embodiment, no two targets associated with a single curriculum area may have the same name. That is, a user may not create a new target that has the same name as existing target.

A target that appears in the list may be renamed by selecting the target and invoking block 630, which may be invoked by clicking a button, selecting a menu item, pressing a combination of keyboard keys, and so on. When a target is selected from the list, and block 630 is invoked, an input method (e.g., a small onscreen window) may appear that displays the target name in an editable text field. The user may elect to change the name of the target. In the preferred embodiment, the user is asked to indicate whether to save or discard the changed name. In the preferred embodiment, no two targets associated with a single curriculum area may have the same name. That is, a user may not rename an existing target so that it has the same name as another existing target.

A target that appears in the list may be deleted from the list by selecting the target and invoking block 635, which may be invoked by clicking a button, selecting a menu item, pressing a combination of keyboard keys, and so on. When a target is selected from the list, and block 635 is invoked, the target is removed from the target list.

Block 620 shows, in one embodiment, a list of the Sd's that have been created. The list of Sd's that are created are, in this embodiment, associated with the curriculum area named in block 605.

A new Sd may be created by invoking block 640, which may be invoked by clicking a button, selecting a menu item, pressing a combination of keyboard keys, and so on. When block 640 is invoked, an input method (e.g., a small onscreen window) may appear that enables the user to type in the name of the new Sd. In the preferred embodiment, the user is asked to indicate whether to save or discard the name of the new Sd. In the preferred embodiment, no two Sd's associated with a single curriculum area may have the same name. That is, a user may not create a new Sd that has the same name as existing Sd.

An Sd that appears in the list may be renamed by selecting the Sd and invoking block 645, which may be invoked by clicking a button, selecting a menu item, pressing a combination of keyboard keys, and so on. When an Sd is selected from the list, and block 645 is invoked, an input method (e.g., a small onscreen window) may appear that displays the Sd name in an editable text field. The user may elect to change the name of the Sd. In the preferred embodiment, the user is asked to indicate whether to save or discard the changed name. In the preferred embodiment, no two Sd's associated with a single curriculum area may have the same name. That is, a user may not rename an existing Sd so that it has the same name as another existing Sd.

An Sd that appears in the list may be deleted from the list by selecting the Sd and invoking block 650, which may be invoked by clicking a button, selecting a menu item, pressing a combination of keyboard keys, and so on. When a target is selected from the list, and block 650 is invoked, the Sd is removed from the Sd list.

The user of the invention may elect to save the curriculum area name, any mastery level data that may have been provided, any targets that may have been provided, and any Sd's that may have been provided. In one embodiment, the aforementioned data is not saved to database 120 until and unless the user invokes block 655, which may be invoked by clicking a button, selecting a menu item, pressing a combination of keyboard keys, and so on. In the preferred embodiment, prior to invoking block 655, all the data that was supplied would reside in the computer's random access memory (RAM), or in a temporary file. When the user of the invention elects to save the aforementioned data, the data are transferred from RAM (or the temporary file) to database 140. In one embodiment, users may not create a new curriculum area whose name is identical to the name of an existing curriculum area.

The user may elect to discard the curriculum area name, any mastery level data that may have been added, any targets that may have been added, and any Sd's that may have been added by invoking block 660, which may be invoked by clicking a button, selecting a menu item, pressing a combination of keyboard keys, and so on. If the user of the invention elects to discard the data, no new information is added to database 140 and the form for creating the curriculum area, the targets, the Sd's, and the mastery level may be closed.

Figure 7:
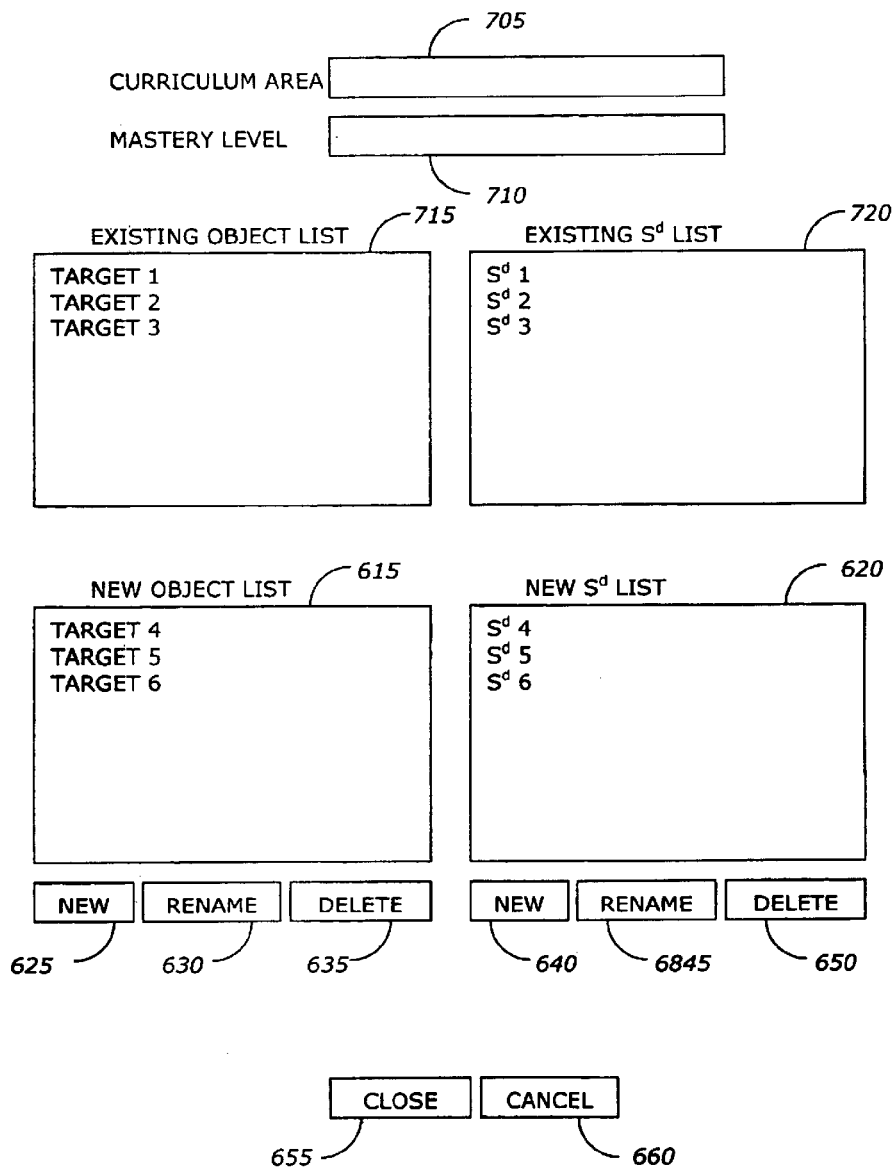
FIG. 7 is an overview of a graphical user interface for adding new targets and Sd's to an existing curriculum area.

FIG. 7 is an overview of a graphical user interface for adding new targets and Sd's to an existing curriculum area. Many of the graphical user interface elements present in FIG. 7 are present in FIG. 6 and have the same functionality as described in FIG. 6. Blocks 615 through 660 in FIG. 7 have identical functionality to the same-numbered blocks as in FIG. 6. The blocks that are new to FIG. 7 are as follows: block 705 displays the name of the existing curriculum area. In the preferred embodiment, because the user of the invention is modifying an existing curriculum area, via this graphical user interface, it is assumed that the curriculum area already has a name. In the preferred embodiment, the name is not editable, but rather displayed for reference. In another embodiment, names of curriculum areas may be edited or otherwise modified.

Block 710 may provides the user of the invention an opportunity to add or modify the mastery level, as defined in FIG. 6. In the preferred embodiment, block 715 displays a list of targets that were previously created using the graphical user interface described in FIG. 6. In the preferred embodiment, block 720 displays a list of targets that were previously created using the graphical user interface described in FIG. 6.

Figure 8:
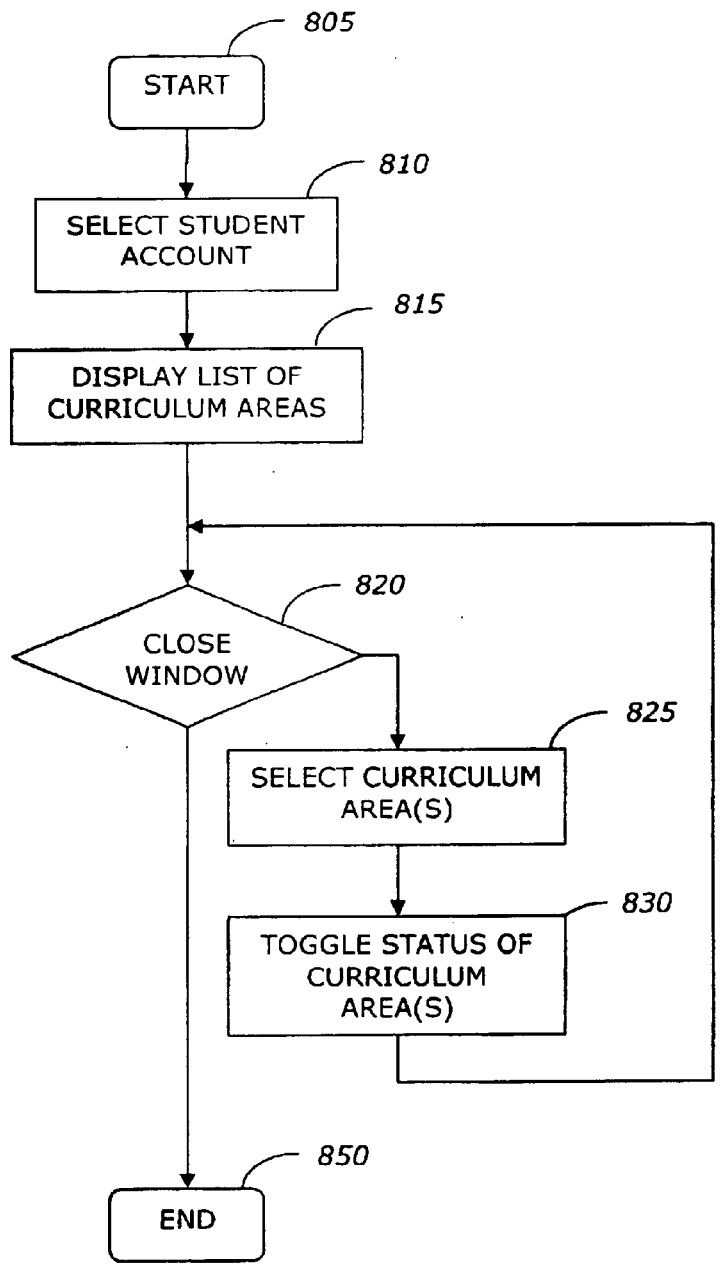
FIG. 8 is a flow diagram illustrating the procedure for associating a subset of curriculum areas to Student account(s).

FIG. 8 is a flow diagram illustrating the procedure for associating a subset of curriculum areas to Student account (s). Database 10 contains information about people involved in discrete trial therapy services, and may include Student accounts. Database 120 contains Content that may be used during discrete trial therapy, and may contain database records for curriculum areas, targets and Sd's. In one embodiment, where a copy of database 120 is sent to a mobile device 240, the user of the invention may wish to send a subset of database 120 rather than a copy of the entire database. FIG. 8 describes the procedure for identifying a subset of Content that is assigned to a specific Student account.

The user of the invention starts at block 805. In FIG. 4, there is a list of user accounts, some or all of which may be Student accounts. In one embodiment, the user of the invention may use a typical mouse input device or a keyboard connected to computer 210 to select a single Student account in block 810. In another embodiment, the user of the invention may select more than one Student account. Proceeding to block 815, the user of the invention may see a list of the currently defined curriculum areas in database 120. The list may appear in an onscreen scrolling window in block 815.

In block 820, the user of the invention may close the window that displays the list of curriculum areas in block 815. If the user of the invention closes the window, proceed to block 850.

Proceeding to block 825, where, in one embodiment, the user of the invention selects a single curriculum area. In another embodiment, the user of the invention may select more than one curriculum area. In one embodiment, there may be a user interface mechanism in block 830 that enables the user of the invention to identify whether the curriculum areas selected in block 825 are assigned or unassigned to the Student(s) selected in block 810. This user interface mechanism may take the form of a check box, where, in one embodiment, curriculum areas that are checked are associated with the selected Student Accounts and those curriculum areas whose check boxes are not checked are not associated with the selected Student account. When the user of the invention finishes identifying the associations between the curriculum area(s) and the selected Student(s), the window in block 820 may be closed, and the procedure continue to block 850.

In the preferred embodiment, the user of the invention may associate a subset of the curriculum areas with Students. In the preferred embodiment, if a curriculum area is not assigned to a Student, none of the targets or Sd's associated with the Curriculum Area are associated with the Student. In another embodiment, the user of the invention may be able to associate individual Sd's and individual targets with selected Students.

Figure 9:
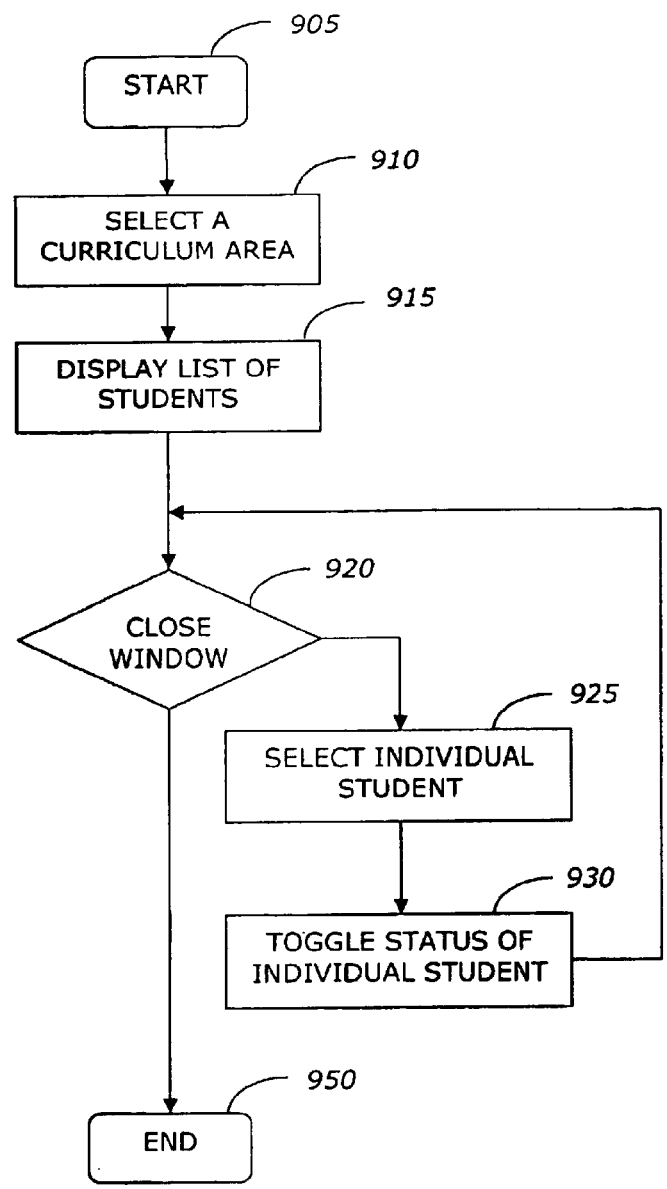
FIG. 9 is a flow diagram illustrating the procedure for associating a subset of Student accounts to curriculum area(s).

FIG. 9 is a flow diagram illustrating the procedure for associating a subset of Student accounts to curriculum area(s). Database 110 contains information about people involved in discrete trial therapy services, and may include Student accounts. Database 120 contains Content that may be used during discrete trial therapy, and may contain database records for curriculum areas. In one embodiment, where a copy of database 120 is sent to a mobile device 240, the user of the invention may wish to send a subset of database 120 rather than a copy of the entire database. FIG. 9 describes the procedure for identifying a subset of Students that are assigned to a specific curriculum area.

The user of the invention starts at block 905. In FIG. 6, the user of the invention creates new curriculum areas, which, in one embodiment, may be listed in a scrolling window, in a manner not unlike how accounts are listed in FIG. 4. In one embodiment, the user of the invention may use a typical mouse input device or a keyboard connected to computer 210 to select a curriculum area in block 910. In another embodiment, the user of the invention may select more than one curriculum area. Proceeding to block 915, the user of the invention may see a list of the currently defined curriculum areas in database 120. The list may appear in an onscreen scrolling window in block 915.

In block 920, the user of the invention may close the window that displays the list of Students in block 915. If the user of the invention closes the window, proceed to block 950.

Proceeding to block 925, where in one embodiment, the user of the invention selects a single Student account. In another embodiment, the user of the invention may select more than one Student account. In one embodiment, there may be a user interface mechanism in block 930 that enables the user of the invention to identify whether the Student account(s) selected in block 915 are assigned or unassigned to curriculum area(s) selected in block 910. This user interface mechanism may take the form of a check box, where, in one embodiment, Student accounts that are checked are associated with the selected curriculum area and those Student accounts whose check boxes are not checked are not associated with the selected curriculum area. When the user of the invention finishes identifying the associations between the selected curriculum area(s) and the Student account(s), the window in block 920 may be closed, and the procedure continue to block 950.

In the preferred embodiment, the user of the invention may associate a subset of the Student accounts with curriculum areas. In the preferred embodiment, if a curriculum area is not assigned to a Student, none of the targets or Sd's associated with the Curriculum Area are associated with the Student. In another embodiment, the user of the invention may be able to associate individual Sd's and individual targets with selected Students.

Figure 10:
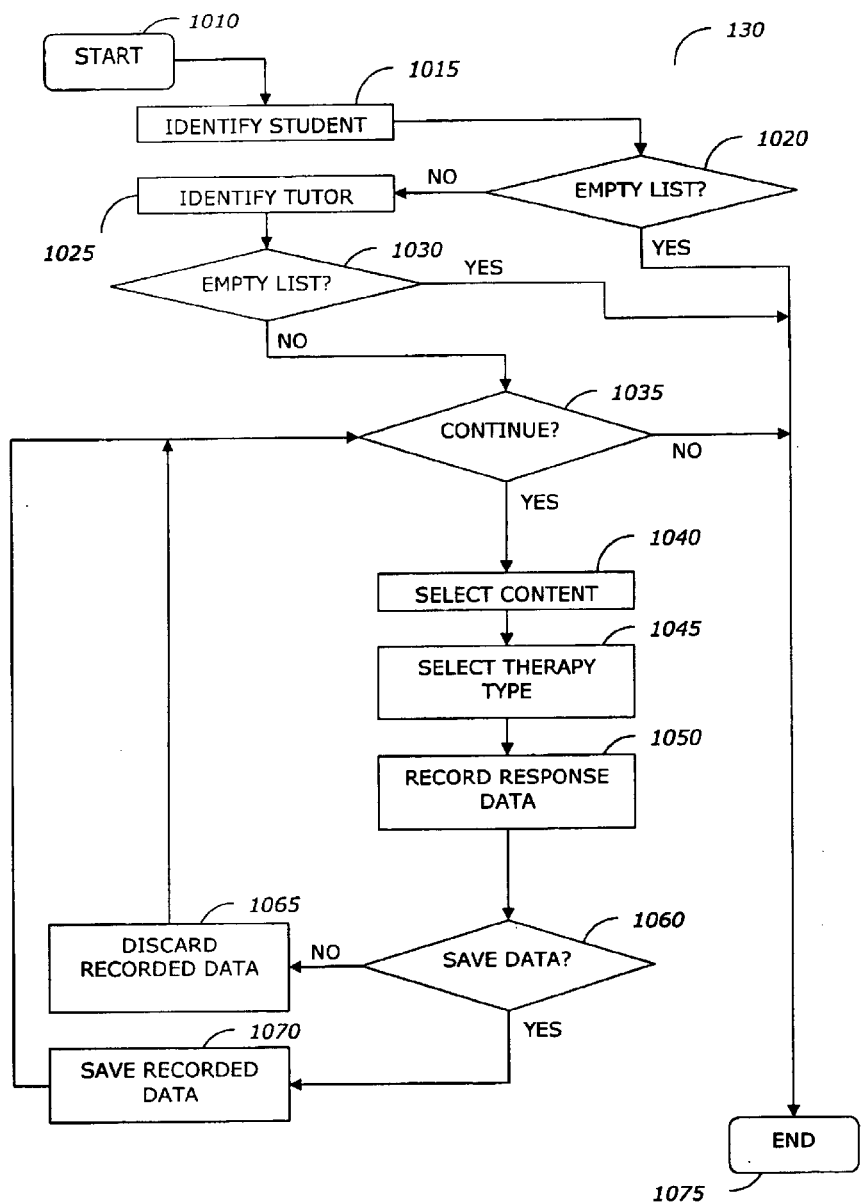
FIG. 10 is a flow diagram illustrating the procedure for recording discrete trial data.

FIG. 10 is a flow diagram illustrating the procedure for recording discrete trial data. In one embodiment, discrete trial data may be recorded on mobile device 240, on computer 210, or on computer 220. Begin at block 1010, which may be an onscreen form as described in FIG. 11. Typically, a Tutor is responsible for recording discrete trial data. So, in block 1015, in one embodiment, the Tutor may identify the Student who is about to receive therapy service by selecting that Student's name, or identifier, from a list of available names or identifiers from database 110. If a test in block 1020 determines the list in block 1015 is empty, any future recorded results may not be assigned to any Student and so the procedure may proceed to its conclusion at block 1075. If the list is nonempty, the Tutor may select a Student name from list 1015 and proceed to block 1025.

In block 1025, the Tutor may identify himself or herself by selecting his or her name, or account identifier, from an onscreen list whose contents may be populated by a subset of database 110. If a test in block 1030 determines that the list in block 1025 is empty, any future recorded results may not be assigned to any Tutor and so the procedure may proceed to its conclusion at block 1075. If the list is nonempty, the Tutor may select his or her name from the list and proceed to block 1035.

At block 1035 the Tutor may proceed with data recording. In one embodiment, this procedure is a loop wherein a Tutor may continue to provide service to the same Student identified in block 1025 without having to re-choose the name or identifier of the Student. If the Tutor elects not to continue at block 1035, the procedure may terminate at block 1075. If the Tutor elects to continue at block 1035, the procedure continues to block 1040.

In block 1040, the Tutor selects the Content which will be used during the delivery of therapy services. This may include selecting a curriculum area, one or more targets, and an Sd from database 120. Block 1040 is detailed in FIG. 12. Proceeding to block 1045, the Tutor selects a type of therapy. One type of therapy may allow for the use of targets as distractors; another type of therapy may not allow for the use of distractors. Proceeding to block 1050, the Tutor may record Student response data; block 1050 is detailed in FIG. 11.

After a Tutor records response data in block 1050, the Tutor may decide in block 1060 whether to save the data recorded in block 1050, or whether to discard it. If the Tutor elects in block 1070 to save the data, a database record may be written to database 140, which may include: the Tutor account identified in block 1015, the Student account identified in block 1025, the Content selected in block 1040, the therapy type selected in block 1045, the response data recorded in block 1050, and the time and date that data was recorded. The system time and date for the computer on which block 130 is run may be affixed to data recorded in block 1050. After the recorded data is recorded in block 170, the procedure returns to block 1035, where the Tutor may elect to continue to record new data or temporarily conclude the delivery of therapy services at block 1075.

If the If the Tutor elects not to save the data in block 1065, no database record is written and the procedure continues to block 1035, where the Tutor may elect to continue to record new data or temporarily conclude the delivery of therapy services at block 1075. Data that is recorded in block 1050 and discarded in block 1065 may not be added to database 140.

Figure 11:
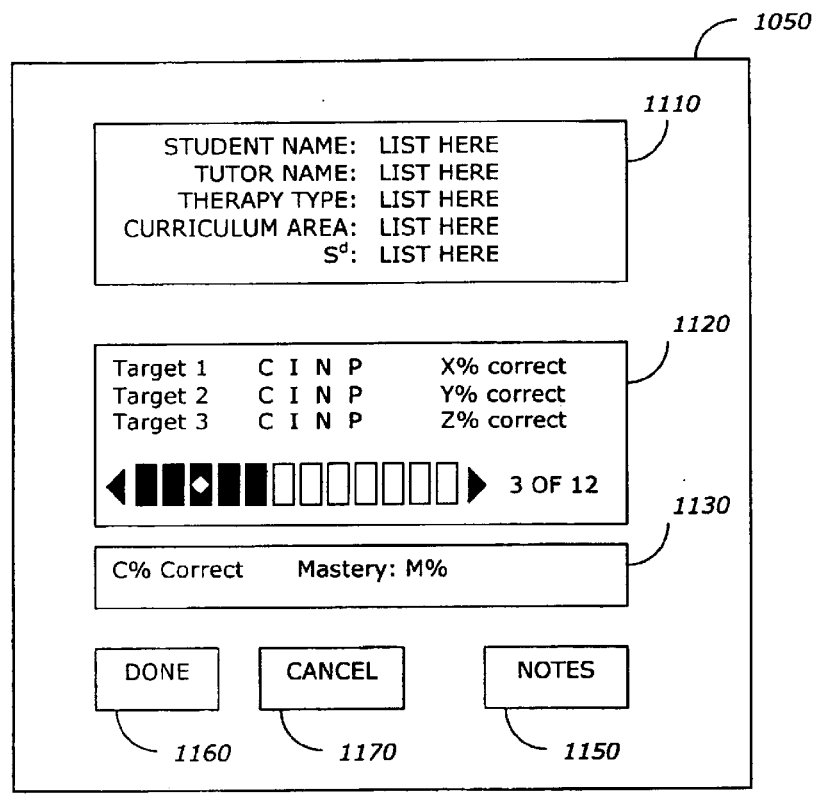
FIG. 11 is an overview of a graphical user interface for recording discrete trial response data.

FIG. 11 is an overview of a graphical user interface for recording discrete trial response data. In the preferred embodiment, Tutors may: identify the Student in block 1015, identify themselves in block 1025, select Content in block 1040, and select a therapy type in block 1045, prior to recording discrete trial data in block 1050. These selections may be displayed in block 1110, for reference to assist the Tutor.

Block 1120 may consist of four parts: there may be a list of the targets chosen in block 1040 (shown on the left); there may be an input method for capturing the responses, which may be Correct, Incorrect, Non-responsive, and Prompted (an array of C, I, N, and P shown in the middle); there may be a display of metrics (shown on the right); and there may be a tracking mechanism that increments how many responses have been recorded (at the bottom of block 1120). The metrics may display the percent correct of each target.

The input method displayed in block 1120 may be an array of buttons, with each row of the array corresponding to a target and each column of the array corresponding to a response of either C (correct), I (incorrect), N (non-responsive), and P (prompted). The Tutor may click any button (or use a similar input method) in the array to associate a response type to a target. Each time a response is recorded, the tracking mechanism indicates that a responses has been recorded. In one embodiment, a row of empty rectangles indicates the maximum number of possible responses, and each time a response is recorded, the leftmost empty rectangle becomes filled. In one embodiment, there is a small diamond that may be positioned over any of the black-filled rectangles or over the leftmost white-filled rectangle. If the diamond is positioned above the Nth black rectangle, the array entry corresponding to the Nth response is displayed. A Tutor may change a previously recorded response. If the diamond is positioned over the leftmost white-filled rectangle, then the array of C, I, N, and P serve as an input method to record the Nth response. The Tutor may click either triangle to move the diamond laterally. The metrics on the right side of block 1120 may measure the percent of recorded responses that a Correct for the corresponding target.

The metrics in block 1130 may display the percent of all responses that are Correct, as recorded in block 1120, and it may display the mastery level, if it is defined in block 610.

In one embodiment, there is Notes button 1150 than enables an input method that a Tutor may use to record notes that become associated with the current set of responses.

The done button in block 1160 may enable a Tutor to temporarily conclude recording responses and save the recorded responses, as described in block 1070.

The cancel button in block 1170 may enable a Tutor to temporarily conclude recording responses and discard the recorded responses, as described in block 1065.

Figure 12:
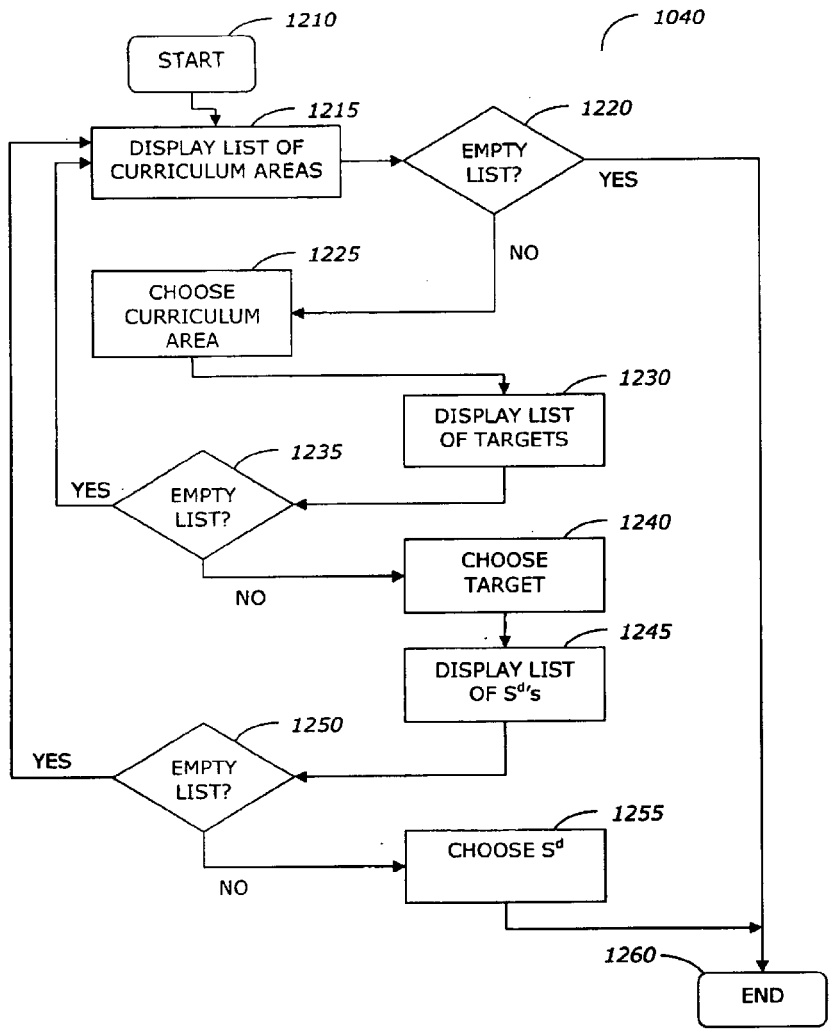
FIG. 12 is a flow diagram illustrating the procedure for choosing curriculum area, target, and Sd parameters.

FIG. 12 is a flow diagram illustrating the procedure for choosing curriculum area, target, and Sd parameters. Database 120 contains a library of the curriculum areas, targets and Sd's used in the delivery of discrete trial therapy services. In one embodiment, before recording Student responses, a Tutor may select a curriculum area, a target, and an Sd, according to FIG. 12, by beginning at block 1210.

In the preferred embodiment, there is a set of Sd's and a set of targets associated in the database with each curriculum area. So, in one embodiment, it may be necessary to display a list of curriculum areas from database 120, in a list in block 1215, which, after one is selected, will determine which set of Sd's and which set of targets are available to choose from later. The list of curriculum areas may appear in one of several different ways onscreen; for example, a list of the curriculum areas may appear in a popup menu, the list may appear in a scrolling window, on so on. The list of curriculum areas may be empty or nonempty. In the preferred embodiment, if a test in block 1220 determines that the list of curriculum areas is empty, then no curriculum area is available, and hence no corresponding set of Sd's and no corresponding set of targets may be available, and there may be no Content about which to record data. So, if the list of curriculum areas is empty, proceed to block 1260.

If a test in block 1220 determines that the list of curriculum areas in block 1215 is nonempty, then the user of the invention may choose a curriculum area in block 1225. In the preferred embodiment, the list of targets that are displayed in block 1230 may be dependent on the curriculum area that was chosen in block 1225. If a test in block 1235 determines that the list of targets (corresponding to the Curriculum Area selected in block 1225) is empty, then the user of the invention may display the list of curriculum areas again in block 1215. If a test in block 1235 determines that the list of targets in block 1230 is nonempty, the user of the invention may select one or more targets in block 1240 and proceed to display a list of Sd's in block 1245.

In the preferred embodiment, the list of Sd's that are displayed in block 1240 may be dependent on the curriculum area that was chosen in block 1225. If a test in block 1250 determines that the list of Sd's (corresponding to the Curriculum Area selected in block 1225) is empty, then the user of the invention may display the list of curriculum areas again in block 1215. If a test in block 1250 determines that the list of Sd's in block 1245 is nonempty, the user of the invention may select one or more Sd's in block 1255 and proceed to block 1260.

In another embodiment, the user may select an Sd before selecting one or more targets.

Figure 13:
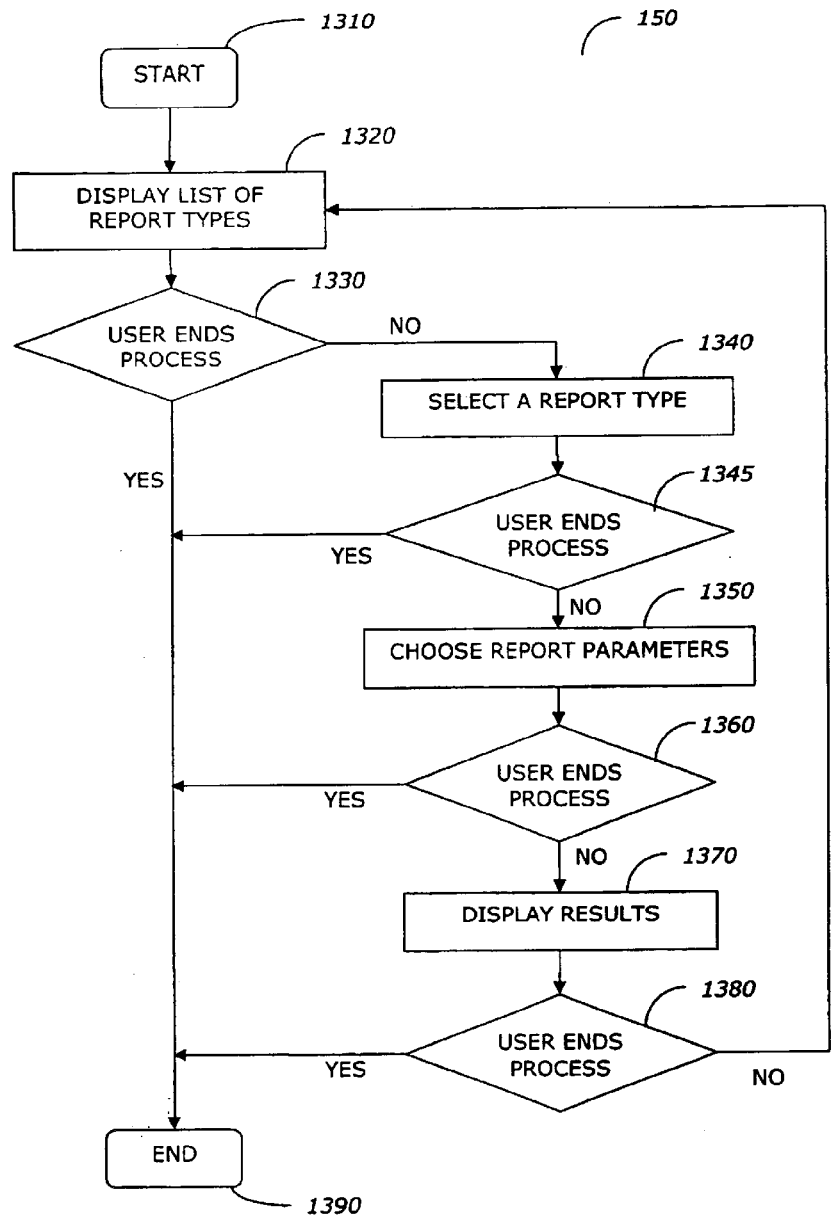
FIG. 13 is a flow diagram illustrating the procedure for displaying data.

FIG. 13 is a flow diagram illustrating the procedure for displaying data. Database 140 may contain data regarding Student responses; the time and duration that Students received discrete trial therapy services; the time and duration that Tutors provide discrete trial therapy services to Students; system times for computer 220, computer 210, and/or mobile device 240; notes that Tutors may have recorded; the curriculum areas, targets, and Sd's used in the delivery of discrete trial therapy services; and so on. People may be interested in the data contained in database 140, and may want to have certain data presented in certain ways to facilitate analysis of the data. People may wish to display data stored in database 140 using the procedure described in FIG. 8.

The user of the invention starts at block 1310 by initiating a request to see a list of available report types in block 1320. This request may be conveyed to the computer by using a mouse, by pressing a sequence or combination of keys on a computer keyboard, and so on. One report type may be distinguished from another by the database query that is used to generate the report or the type of data that is displayed in the report. For example, a report that displays the amount of time a Student has received discrete trial therapy services may be a different report type than a report that displays a subset of raw data from database 140. There may be any number of report types available in the embodiment.

In block 1320, the user may see a list of different report types. At block 1330, block 1345, block 1360, and block 1380, the user of the invention may elect to end the procedure and proceed to block 1390. In block 1340, the user of the invention may choose a report type. In block 1350, the user of the invention may choose report parameters. These parameters may affect the database query that may build the report; examples of parameters include, choosing a specific data range, filtering out data for one or more Student accounts, and filtering out data for one or more Tutor account.

After the parameters are chosen, the user of the invention may see the results displayed in block 1380. The results may be based on the report type selected in block 1340 and the parameters chosen in block 1350. The data may be displayed on a computer screen or may be sent to a printer.

Figure 14:
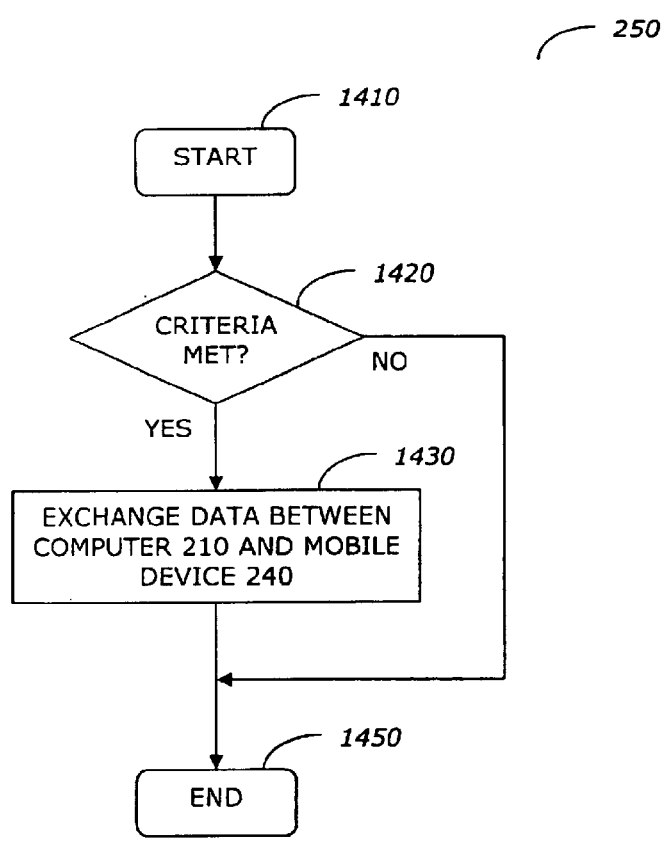
FIG. 14 is a flow diagram illustrating the procedure for synchronizing data between computer 210 and mobile device 240.

FIG. 14 is a flow diagram illustrating the procedure for synchronizing data between computer 210 and mobile device 240. In the preferred embodiment, a mobile device 240 is assigned to a Student, who may be uniquely defined in database 110. The procedure for recording data (via FIG. 10) may reside on mobile device 240. In this embodiment, it is necessary to transfer copies of subsets of database 110 and 120 to mobile device 240. To enable this embodiment, there must be a procedure for exchanging data between computer 210 and mobile device 240. In the preferred embodiment, exchanging data between a mobile device 240 may be facilitated by developing a software program that uses an open Application Programming Interface (API) for a specific type of device 240. For example, if mobile device 240 is a Palm OS handheld, then data may be exchanged via the Palm OS HotSync application; more specifically, each application that is installed on a Palm device and exchanges data with a computer must have a HotSync conduit written for the specific application enabling it to exchange data.

After the procedure to exchange data begins in block 1410, a test is conducted in block 1420. The test may determine whether data may be exchanged between computer 210 and mobile device 240. The criteria for the test may include: determining whether there is a computer program present on computer 210 which may exchange data with the mobile device 240; determining whether the data stored on mobile device 240 has a compatible data structure as that of database 140; determining whether an identifier on mobile device 240 has a matching identifier on computer 210, and so on. If all of the criteria in the embodiment are not met in block 1420 then the procedure for exchanging data is terminated and the procedure continues to block 1450.

If all the criteria in the embodiment are met in the test in block 1420, then data may be exchanged at block 1430. Exchanging data may include moving or copying some or all of database 110, database 120, and/or database 140 between mobile device 240 and computer 210.

In the preferred embodiment, a Student identifier is assigned to mobile device 240, and the following data is copied from computer 210 to mobile device 240: Tutor account information from database 110, content from database 120 that corresponds (using the procedures in FIG. 8 and FIG. 9) to the Student identifier that is assigned to mobile device 240. The data that may be copied or moved from mobile device 240 to computer 210 may include: the Student identifier assigned to mobile device 240, and Student's performance data that conforms to the format of database 140 (if it has been created on mobile device 240 according to the procedure in FIG. 10).

In the preferred embodiment, the performance data (on mobile device 240) that conforms to the data structure in database 140 may be added to database 140 on computer 210 (via data exchange procedure 150), so that database 140 on computer 210, as different performance data is added to it from different mobile devices 240, represents a master repository of Student performance data.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A computer system for processing discrete trial therapy data, comprising:
   (a) a user interface configured to add new accounts for students and tutors,
   (b) a user interface configured to modify existing account information for students and tutors;
   (c) a user interface configured to add and modify content in a database, wherein the content includes one or more curriculum areas, one or more lists of targets related to the curriculum areas, and one or more lists of discriminative stimulii related to individual curriculum areas;
   (d) a user interface configured to record and store student performance data and notes from the tutor conducting the therapy session; and
   (e) a user interface configured to query and display student performance data and metrics related to the success of the student to the therapy.

2. The system of claim 1, wherein the user interface to record student performance data in a database is further configured to
   (a) enable a tutor to select his or her name in the user interface to associate the tutor account with data that the tutor records;
   (b) enable a tutor to select a mode of therapy to associate with the student performance data that the tutor records;
   (c) enable a tutor to select content assigned to the student;
   (d) enable a tutor to record individual responses to questions or statements posed by the tutor;
   (e) enable a tutor to display performance data previously recorded for a student; and
   (f) enable a tutor to create notes that correspond to a therapy session.

3. The system of claim 1, wherein the user interface to add new and modify existing student account information is further configured to create multiple student accounts in a database, wherein each student account is unique.

4. The system of claim 1, wherein the user interface to add and modify content in a database is further configured to associate a subset of the content to a subset of student accounts.

5. The system of claim 1, wherein the user interface to record and store student performance data is further configured to enable a tutor to review and modify previously recorded responses provided by the student and recorded by the tutor.

6. The system of claim 1, wherein the user interface configured to query and student performance data and metrics related to the success of the student to the therapy is further configured to display the performance data and metrics based on user-selectable parameters.

7. A computer system for providing information for conducting a discrete trial therapy session, comprising:

an account storage device configured to store account information of one or more tutors who provide discrete trial therapy services, and configured to store account information of one or more students who receive the discrete trial therapy services from the one or more tutors;

a content storage device configured to store a trial therapy content that is used by the one or more tutors to provide therapy services to the one or more students, wherein the trial therapy content comprises curriculum areas, lists of targets related to curriculum areas, and lists of discriminative stimulii related to individual curriculum areas;

a performance storage device configured to store discrete trial data associated with the responses from each of the one or more students who receive the discrete trial therapy services;

a first communication network;

a first computer in data communication with said account storage device, said content storage device, and said performance storage device via said first communication network, comprising a display; and an input device;

wherein said first computer is configured to receive at least a subset the account information from said account storage device and display the received account information on said display, and said first computer is configured to receive at least a subset, of the trial therapy content from said content storage device based on the account information said computer receives to display the trial therapy content on said display, and said first computer is configured to record discrete trial data resulting from a therapy session entered into said first computer using said input device, and said first computer is further configured to communicate the discrete trial data to said performance storage device.

8. The system of claim 7, wherein the discrete trial data comprises data corresponding to a plurality of trial responses, data indicating when the responses were recorded, performance metrics, notes associated with the trial responses, and identification of the content that was used for the discrete trial therapy session.

9. The system of claim 7, wherein one or more of said account storage device, said content storage device, and said performance storage device are databases.

10. The system of claim 7, further comprising:

a second computer in data communication with said first computer via said first communication network, said second computer comprising a display device in data communication with the performance storage device, wherein said second computer is configured to provide results of the discrete trial therapy on said display device; and a user interface displayable on said display device to query and display discrete trial data and metrics associated with the discrete trial data;

wherein said account storage device, said content storage device, and said performance storage device reside on said second computer.

11. The system of claim 7, wherein said first computer is a mobile device.

12. The system of claim 11, wherein said first computer comprises copies of at least a subset of the information stored in said account storage device, said content storage device, and said performance storage device.

13. The system of claim 7, wherein the first computer comprises a first user interface configured to receive an input of the name of a tutor, display performance data previously recorded for a student, receive an input identifying a mode of therapy for a discrete trial therapy session, receive an input identifying content for the discrete trial therapy session, display trial information corresponding to content identified for the therapy session, receive an input associated with the responses one or more trials posed by the tutor during the discrete therapy session, and receive an input of one or more notes that correspond to a therapy session.

14. The system of claim 7, further comprising:

a second computer connected to said first computer by said first communication network;

a second communication network; and a third computer connected to said second computer by said second communication network;

wherein said first computer is a mobile device, and said account storage device, said content storage device, and said performance storage device each resides on one of said first, second or third computers.

15. A method of providing information for conducting discrete trial therapy, comprising:

creating an identification account in an account storage device, the identification account identifying one or more tutors who deliver therapy services and identifying one or more students who receive the therapy services;

storing a trial therapy content comprising curriculum areas, lists of targets related to curriculum areas, and lists of discriminative stimulii related to individual curriculum areas in a content storage device, wherein at least a subset of the trial therapy content is used during a discrete trial therapy session;

providing a list of one or more students from the account storage device to a user interface displayed on a computer such that the tutor can identify and select a student to receive the discrete trial therapy;

providing at least a subset of the trial therapy content from the content storage device to a user interface displayed on a computer such that the tutor can select the content for use in the therapy session, wherein the step of providing at least a subset of the trial therapy content is based on the identity of the student;

providing curriculum and target information to a user interface on a computer for use during the therapy session based on the content selected by the tutor and the identity of the student;

recording the one or more responses of the student for one or more trials during a discrete trial therapy session in a user interface on the computer; and storing discrete trial data in a performance storage device, wherein the discrete trial data comprises data associated with the responses from the student who received the discrete trial therapy services, the date when the responses were recorded, performance metrics, notes, and identification of the content that was used during the delivery of therapy services.

16. The method of claim 15, further comprising:

displaying a list of reports that are available for generation, wherein the reports contain at least a subset of the discrete trial data stored in the performance storage device;

receiving an input selecting a report from the list of reports;

receiving an input selecting parameters for the generation of the selected report;

generating the selected report using the selected parameters; and displaying the selected report.

17. The method of claim 15, further comprising associating at least a subset of the trial therapy content with each student identified in the account storage device.

18. The method of claim 15, wherein the step of creating an identification account comprises modifying existing account information.

19. A method of providing discrete trial content to a tutor for conducting discrete trial therapy, comprising:

storing content data that is associated with a student on a first computer that is in data communication with a second computer, wherein the content data comprises curriculum areas, targets, and discriminative stimulus, and wherein the content data stored on the first computer is at least a subset of content data stored in a content storage database on a second computer;

displaying a list of one or more curriculum areas on a display of the first computer;

receiving an input identifying a curriculum area for the discrete trial therapy session from the displayed list of one or more curriculum areas;

retrieving a list a one or more targets from the content data stored on the first computer, wherein the list of targets corresponds with the identified curriculum area;

displaying the list of targets on the display of the first computer;

receiving an input identifying one or more targets for the discrete trial therapy session;

retrieving a list of one or more discriminative stimulus from the content data stored on the first computer, wherein the list of discriminative stimulus corresponds with the identified one or more targets; and displaying the targets and discriminative stimulus on the first computer for the tutor to use for a discrete trial therapy session.

20. A method of recording discrete trial data for a discrete trial therapy session, comprising:

displaying a list of one or more targets on a user interface of a first computer;

providing a response data input area on the user interface corresponding to the list of one or more targets for recording data corresponding to the response of a student to a trial, wherein the response input area provides for characterizing the response of a student as correct, incorrect, non-responsive, or prompted;

receiving one or more response inputs via the user interface corresponding to the one or more responses of a student during a therapy session;

recording the one or more response inputs in the first computer;

displaying a tracking mechanism on the user interface to indicate a response has been recorded, wherein the tracking mechanism is updated after a response to a trial is recorded; and displaying one or more metrics that correspond to the response of a student to a trial, wherein the displayed one or more metrics are updated after a response to the trial is recorded.

21. The method of claim 20, further comprising providing a notes data input area on the user interface, wherein the notes input area provides for recording notes associated with the discrete trial therapy session.

22. The method of claim 20, wherein providing a tracking mechanism comprises:

providing a graphical display on the user interface that shows that a response has been recorded by the first computer; and providing a graphical display on the user interface that includes a set of response indicators where each response indicator represents a previously recorded response to a trial, a set of candidate indicators where each candidate indicator represents a trial that can be presented to the student, and a movable third indicator, wherein response data corresponding to the response indicator is displayed on the user interface when the third indicator is positioned on one of the response indicators in the set of response indicators, and wherein data corresponding to a candidate trial is displayed on the user interface when the third indicator is positioned on one of the candidate indicators in the set of candidate indicators.

23. The method of claim 22, further comprising providing a graphical user interface on the first computer for receiving data associated with a therapy session, wherein the data associated with a therapy session comprises data that identifies the student, identifies the tutor, identifies the type of therapy, identifies the curriculum area, and identifies the discriminative stimulus;

receiving the data with a therapy session via the user interface; and displaying the data associated with a therapy session for reference to assist the tutor.

24. The method of 23, wherein said first computer is a mobile device.

25. The method of claim 24, further comprising storing the response inputs and the data associated with the therapy session in a performance data storage device in a second computer.

26. A method for reporting discrete trial data, comprising:

recording on a first computer performance data for a first set of one or more discrete trial therapy sessions associated with the responses of a student to a plurality of trials;

sending the performance data for a first set of one or more discrete trial therapy sessions from the first computer to a second computer;

recording on the first computer performance data for a second set of one or more discrete trial therapy sessions associated with the responses of a student to a plurality of trials;

sending the performance data for a second set of one or more discrete trial therapy sessions from the first computer to a second computer; and analyzing the first set of one or more discrete trial therapy sessions and the second set of one or more discrete trial therapy sessions on the second computer; and providing a report corresponding to the performance data for the first set of one or more discrete trial therapy sessions and the second set of one or more discrete therapy sessions, wherein the report is based on analyzing both the first set of one or more discrete trial therapy sessions and the second set of one or more discrete trial therapy session.

27. A computer-readable medium containing instructions for controlling a computer system to conduct discrete trial therapy, by:

storing content data that is associated with a student on a first computer that is in data communication with a second computer, wherein the content data comprises curriculum areas, targets, and discriminative stimulus, and wherein the content data stored on the first computer is at least a subset of content data stored in a content storage database on a second computer;

displaying a list of one or more curriculum areas on a display of the first computer;

receiving an input identifying a curriculum area for the discrete trial therapy session from the displayed list of one or more curriculum areas;

retrieving a list a one or more targets from the content data stored on the first computer, wherein the list of targets corresponds with the identified curriculum area;

displaying the list of targets on the display of the first computer;

receiving an input identifying one or more targets for the discrete trial therapy session;

retrieving a list of one or more discriminative stimulus from the content data stored on the first computer, wherein the list of discriminative stimulus corresponds with the identified one or more targets; and displaying the targets and discriminative stimulus on the first computer for the tutor to use for a discrete trial therapy session.

* * * * *